US012642272B2

(12) United States Patent (10) Patent No.: US 12,642,272 B2

Scott et al. (45) Date of Patent: Jun. 2, 2026

(54) METHODS OF PROTECTING A PLANT FROM INSECT PESTS

(71) Applicant: NOVOZYMES BIOAG A/S, Bagsvaerd (DK)

(72) Inventors: Brian R. Scott, Kanata (CA); Jarrod Leland, Blacksburg, VA (US); Calum Russell, Roanoke, VA (US); Dave Greenshields, Saskatoon (CA)

(73) Assignee: NOVOZYMES BIOAG A/S, Bagsvaerd (DK)

( * ) Notice: Subject to any disclaimer, the term of this patent is extended or adjusted under 35 U.S.C. 154(b) by 1303 days.

(21) Appl. No.: 16/972,971

(22) PCT Filed: Jun. 5, 2019

(86) PCT No.: PCT/US2019/035600

§ 371 (c)(1),
(2) Date: Dec. 7, 2020

(87) PCT Pub. No.: WO2019/236717

PCT Pub. Date: Dec. 12, 2019

(65) Prior Publication Data

US 2021/0251238 A1     Aug. 19, 2021

Related U.S. Application Data

(60) Provisional application No. 62/781,402, filed on Dec. 18, 2018, provisional application No. 62/680,742, filed on Jun. 5, 2018.

(51) Int. Cl.

| | |
|---|---|
| *A01N 63/20* | (2020.01) |
| *A01N 51/00* | (2006.01) |
| *A01N 57/16* | (2006.01) |
| *A01N 63/22* | (2020.01) |
| *A01N 63/28* | (2020.01) |
| *A01N 63/30* | (2020.01) |
| *A01N 63/34* | (2020.01) |
| *A01N 63/50* | (2020.01) |

(52) U.S. Cl.
CPC ............. *A01N 63/50* (2020.01); *A01N 51/00* (2013.01); *A01N 57/16* (2013.01); *A01N 63/20* (2020.01); *A01N 63/22* (2020.01); *A01N 63/28* (2020.01); *A01N 63/30* (2020.01); *A01N 63/34* (2020.01)

(58) Field of Classification Search
CPC ........ A01N 63/50; A01N 63/20; A01N 63/22; A01N 63/28; A01N 63/30; A01N 63/34; A01N 51/00; A01N 57/16; A01N 25/12; A01N 25/26
See application file for complete search history.

(56) References Cited

U.S. PATENT DOCUMENTS

| | | | | |
|---|---|---|---|---|
| 4,762,547 A | * | 8/1988 | Iwasaki | ................. A01N 63/10 504/362 |
| 2007/0180578 A1 | | 8/2007 | McCutchen | |
| 2010/0122379 A1 | | 5/2010 | Dieckmann | |
| 2017/0290339 A1 | | 10/2017 | Curtis | |

FOREIGN PATENT DOCUMENTS

| | | | | |
|---|---|---|---|---|
| CN | 107372661 A | | 11/2017 | |
| EP | 0702897 A1 | | 3/1996 | |
| GB | 2090139 A | * | 7/1982 | ............. A01N 31/02 |
| WO | WO-2006136159 A2 | * | 12/2006 | ............... C12N 9/20 |
| WO | WO-2018026773 A1 | * | 2/2018 | ............... A01C 1/06 |

OTHER PUBLICATIONS

Harrison et al, 2010, Toxins 2(5), 935-953.

* cited by examiner

*Primary Examiner* — Ali Soroush
(74) *Attorney, Agent, or Firm* — Adam Rucker

(57) ABSTRACT

A method of controlling or preventing pathogenic damage and/or pest damage in a plant propagation material, a plant, part of a plant and/or plant organ, comprising applying on the plant, part of the plant, plant organ, plant propagation material or a surrounding area thereof a phytoprotective agent comprising an enzyme and an insecticide.

19 Claims, No Drawings

Specification includes a Sequence Listing.

METHODS OF PROTECTING A PLANT FROM INSECT PESTS

CROSS-REFERENCE TO RELATED APPLICATIONS

This application is a 35 U.S.C. 371 national application of international application no. PCT/US2019/035600, filed Jun. 5, 2019, which claims priority or the benefit under 35 U.S.C. 119 of U.S. Provisional Patent Application Nos. 62/680,742 and 62/781,402, filed Jun. 5, 2018 and Dec. 18, 2018, respectively, the contents of which are fully incorporated herein by reference.

REFERENCE TO A SEQUENCE LISTING

This application contains a Sequence Listing in computer readable form, which is incorporated herein by reference.

BACKGROUND

Because of increasing populations and corresponding demands for more efficient and productive farms, there remains a need for new methods for protecting crops and plants from pests and/or insects, thereby preventing waste and economic loss while improving crop yields and ensuring a sufficient global food supply.

SUMMARY OF THE CLAIMED INVENTION

The present disclosure provides methods for of controlling or preventing pathogenic damage and/or pest damage in a plant propagation material, a plant, part of a plant and/or plant organ, comprising applying on the plant, part of the plant, plant organ, plant propagation material or a surrounding area thereof a phytoprotective agent comprising an enzyme and an insecticide.

The application of a certain phytoprotective agent comprising combinations of an enzyme and an insecticide can enhance the spectrum of action with respect to the pest to be controlled, e.g. the insect pest. For example, the application of an agent comprising combination of enzyme and an insecticide may cause an increase in the insecticidal action of the agent which would be greater than that expected from each component when used alone. This allows, on the one hand, a substantial broadening of the spectrum of pests that can be controlled and, on the other hand, improved economics of use through lower rates of application. However, besides the action with respect to pest control, the methods of the invention can have further advantageous properties which can also be described, in a wider sense, as beneficial activity. Examples of such advantageous properties may include: a broadening of the spectrum of activity; a reduction in the rate of application of the active ingredient(s); mitigation of resistance development; adequate pest control with the aid of the compositions according to the invention, sometimes even at a rate of application at which the individual compounds are totally ineffective; advantageous behaviour during formulation and/or upon application, for example upon grinding, sieving, emulsifying, dissolving or dispensing, increased storage stability; improved stability to light; more advantageous degradability; improved toxicological and/or ecotoxicological behaviour; improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigor, and early germination; or any other advantages familiar to a person skilled in the art.

DETAILED DESCRIPTION

This description is not intended to be a detailed catalog of all the different ways in which the invention may be implemented or of all the features that may be added to the instant invention. For example, features illustrated with respect to one embodiment may be incorporated into other embodiments and features illustrated with respect to a particular embodiment may be deleted from that embodiment. In addition, numerous variations and additions to the various embodiments suggested herein, which do not depart from the instant invention, will be apparent to those skilled in the art in light of the instant disclosure. Hence, the following description is intended to illustrate some particular embodiments of the invention and not to exhaustively specify all permutations, combinations and variations thereof.

The terminology used herein is for the purpose of describing particular embodiments only and is not intended to be limiting of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For the sake of brevity and/or clarity, well-known functions or constructions may not be described in detail.

As used herein, the singular forms "a," "an," and "the" are intended to include the plural forms as well, unless the context clearly indicates otherwise.

As used herein, the terms "acaricide" and "acaricidal" refer to an agent or combination of agents the application of which is toxic to an acarid (i.e., kills an acarid, inhibits the growth of an acarid and/or inhibits the reproduction of an acarid).

As used herein, the term "agriculturally acceptable carrier" refers to a substance or composition that can be used to deliver a phytoprotective agent to a plant, plant part or plant growth medium (e.g., soil) without causing/having an unduly adverse effect on plant growth and/or yield. As used herein, the term "foliar-compatible carrier" refers to a material that can be foliarly applied to a plant or plant part without causing/having an unduly adverse effect on the plant, plant part, plant growth, plant health, or the like. As used herein, the term "seed-compatible carrier" refers to a material that can be applied to a seed without causing/having an unduly adverse effect on the seed, the plant that grows from the seed, seed germination, or the like. As used herein, the term "soil-compatible carrier" refers to a material that can be added to a soil without causing/having an unduly adverse effect on plant growth, soil structure, soil drainage, or the like.

As used herein, the term "and/or" is intended to include any and all combinations of one or more of the associated listed items, as well as the lack of combinations when interpreted in the alternative ("or"). Thus, the phrase "A, B and/or C" is to be interpreted as "A, A and B, A and B and C, A and C, B, B and C, or C."

As used herein, the terms "associated with," in association with" and "associated therewith," when used in reference to a relationship between a composition of the present disclosure and a plant or plant part, refer to at least a juxtaposition or close proximity of the composition and the plant or plant part. Such a juxtaposition or close proximity may be achieved by contacting or applying a composition directly to the plant or plant part and/or by applying the composition to the plant growth medium (e.g., soil) in which the plant or plant part will be grown (or is currently being grown). According to some embodiments, a composition is applied as a coating to the outer surface of the plant or plant part. According to some embodiments, a composition is applied to soil at, near or surrounding the site in which the plant or plant part will be grown (or is currently being grown).

As used herein, the term "aqueous" refers to a composition that contains more than a trace amount of water (i.e., more than 0.5% water by weight, based upon the total weight of the composition).

As used herein, the term "dispersant" refers to an agent or combination of agents the application of which reduces the cohesiveness of like particles, the surface tension of a liquid, the interfacial tension between two liquids and/or the interfacial tension between or a liquid and a solid.

As used herein, the terms "effective amount," "effective concentration" and "effective amount/concentration" refer to an amount or concentration that is sufficient to cause a desired effect (e.g., reduced pest damage and/or severity). The absolute value of the amount/concentration that is sufficient to cause the desired effect may be affected by factors such as the type and magnitude of effect desired, the type, size and volume of material to which the composition will be applied, the type(s) of phytoprotective agent in the composition, the amount of phytoprotective agent in the composition, the stability of the phytoprotective agent in the composition and the storage conditions (e.g., temperature, relative humidity, duration). Those skilled in the art will understand how to select an effective amount/concentration using routine dose-response experiments.

As used herein, the term "foliage" refers to those portions of a plant that normally grow above the ground, including, but not limited to, leaves, stalks, stems, flowers, fruiting bodies and fruits.

As used herein, the terms "foliar application" and "foliarly applied" refer to the application of the composition of the present disclosure to the foliage of a plant (e.g., to the leaves of the plant). Application may be affected by any suitable means, including, but not limited to, spraying the plant with the composition of the present disclosure. In some embodiments, the composition of the present disclosure is/are applied to the leaves, stems and/or stalk of the plant and not to the flowers, fruiting bodies or fruits of the plant.

As used herein, the terms "fungicide" and "fungicidal" refer to an agent or combination of agents the application of which is toxic to a fungus, kills a fungus, inhibits the growth of a fungus, inhibits the reproduction of a fungus, inhibits and/or prevents spore formation by a fungus, and/or inhibits or prevents pathogenic activity by a fungus.

As a skilled person will appreciate, the terms "insecticide" and "insecticidal" refer to an agent or combination of agents the application of which is toxic to an insect, kills an insect, inhibits the growth of an insect, inhibits the reproduction of an insect, and/or inhibits or prevents pathogenic activity by an insect. However, "insect" and "insecticide" are commonly used terms in the field of agriculture therefore it is intended that the scope of the invention is understood to encompass agriculturally-relevant insects generally.

As used herein, the term "isomer" includes all stereoisomers of the compounds and/or molecules to which it refers, including enantiomers and diastereomers, as well as all conformers, roatmers and tautomers, unless otherwise indicated. Compounds and/or molecules disclosed herein include all enantiomers in either substantially pure levorotatory or dextrorotatory form, or in a racemic mixture, or in any ratio of enantiomers. Where embodiments disclose a (D)-enantiomer, that embodiment also includes the (L)-enantiomer, where embodiments disclose a (L)-enantiomer, that embodiment also includes the (D)-enantiomer. Where embodiments disclose a (+)-enantiomer, that embodiment also includes the (−)-enantiomer, where embodiments disclose a (−)-enantiomer, that embodiment also includes the (+)-enantiomer. Where embodiments disclose a (S)-enantiomer, that embodiment also includes the (R)-enantiomer, where embodiments disclose a (R)-enantiomer, that embodiment also includes the (S)-enantiomer.

Embodiments are intended to include any diastereomers of the compounds and/or molecules referred to herein in diastereomerically pure form and in the form of mixtures in all ratios. Unless stereochemistry is explicitly indicated in a chemical structure or chemical name, the chemical structure or chemical name is intended to embrace all possible stereoisomers, conformers, rotamers and tautomers of compounds and/or molecules depicted.

As used herein, the terms "nematicide" and "nematicidal" refer to an agent or combination of agents the application of which is toxic to a nematode, kills a nematode, inhibits the growth of a nematode, inhibits the reproduction of a nematode, and/or inhibits or prevents pathogenic activity by a nematode.

As used herein, the term "non-aqueous" refers to a composition that comprises no more than a trace amount of water (i.e., no more than 0.5% water by weight, based upon the total weight of the composition).

As used herein, the term "nutrient" refers to a compound or element useful for nourishing a plant (e.g., vitamins, macrominerals, micronutrients, trace minerals, organic acids, etc. that are necessary for plant growth and/or development).

As used herein, the terms "percent identity," "% identity" and "percent identical" refer to the relatedness of two or more nucleotide or amino acid sequences, which may be calculated by (i) comparing two optimally aligned sequences over a window of comparison, (ii) determining the number of positions at which the identical nucleic acid base (for nucleotide sequences) or amino acid residue (for proteins) occurs in both sequences to yield the number of matched positions, (iii) dividing the number of matched positions by the total number of positions in the window of comparison, and then (iv) multiplying this quotient by 100% to yield the percent identity. If the "percent identity" is being calculated in relation to a reference sequence without a particular comparison window being specified, then the percent identity is determined by dividing the number of matched positions over the region of alignment by the total length of the reference sequence. Accordingly, for purposes of the present invention, when two sequences (query and subject) are optimally aligned (with allowance for gaps in their alignment), the "percent identity" for the query sequence is equal to the number of identical positions between the two sequences divided by the total number of positions in the query sequence over its length (or a comparison window), which is then multiplied by 100%.

As used herein, the term "pest" includes any organism or virus that negatively affects a plant, including, but not limited to, organisms and viruses that spread disease, damage host plants and/or compete for soil nutrients. The term "pest" encompasses organisms and viruses that are known to associate with plants and to cause a detrimental effect on the plant's health and/or vigor. Plant pests include, but are not limited to, arachnids (e.g., mites, ticks, spiders, etc.), gastropods (e.g., slugs, snails, etc.), invasive plants (e.g., weeds), insects (e.g., white flies, thrips, aphids, weevils, etc.), nematodes (e.g., root-knot nematode, soybean cyst nematode, etc.), rodents and viruses (e.g., tobacco mosaic virus (TMV), tomato spotted wilt virus (TSWV), cauliflower mosaic virus (CaMV). Preferably, plant pests that are the target of the present invention are sucking insects and/or chewing insects and include organisms of Class Insecta, more preferably organisms of Order Hemiptera, Thysanoptera, Coleoptera, Lepidoptera and/or Orthoptera, As used herein, the terms "pesticide" and "pesticidal" refer to agents or combinations of agents the application of which can include an insecticide or have insecticidal properties.

As used herein, the term "plant" includes all plant populations, including, but not limited to, agricultural, horticultural, ornamental, and silvicultural plants. The term "plant" encompasses plants obtained by conventional plant breeding and optimization methods (e.g., marker-assisted selection) and plants obtained by genetic engineering, including cultivars protectable and not protectable by plant breeders' rights. The term "plant" also encompasses crops.

As used herein, the term "plant cell" refers to a cell of an intact plant, a cell taken from a plant, or a cell derived from a cell taken from a plant. Thus, the term "plant cell" includes cells within seeds, suspension cultures, embryos, meristematic regions, callus tissue, leaves, shoots, gametophytes, sporophytes, pollen and microspores.

As used herein, the term "plant part" refers to any part of a plant, including cells and tissues derived from plants. Thus, the term "plant part" may refer to any of plant components or organs (e.g., leaves, stems, roots, etc.), plant tissues, plant cells and seeds. Examples of plant parts, include, but are not limited to, anthers, embryos, flowers, fruits, fruiting bodies, leaves, ovules, pollen, rhizomes, roots, seeds, shoots, stems and tubers, as well as scions, rootstocks, protoplasts, calli and the like.

As used herein, the term "plant propagation material" refers to a plant part from which a whole plant can be generated. Examples of plant propagation materials include, but are not limited to, cuttings (e.g., leaves, stems), rhizomes, seeds, tubers and cells/tissues that can be cultured into a whole plant.

While certain aspects of the present disclosure will hereinafter be described with reference to embodiments thereof, it will be understood by those of ordinary skill in the art that various changes in form and details may be made therein without departing from the spirit and scope of the present disclosure as defined by the claims.

SEQ ID NO: 1 is a *Thermomyces lanuginosus* lipase.

Compositions of the present disclosure may comprise any agriculturally acceptable carrier(s), including, but not limited to, foliar-compatible carriers, seed-compatible carriers and soil-compatible carriers. Selection of appropriate carrier materials will depend on the intended application(s) and the elements present in the composition. In some embodiments, the carrier material(s) will be selected to provide a composition in the form of a liquid, gel, slurry, or solid. In some embodiments, the carrier will consist essentially of or consist of one or more stabilizing compounds.

The compositions of the present disclosure may be applied to any part/portion of a plant. In some embodiments, the compositions are applied to plant propagation materials (e.g., cuttings, rhizomes, seeds and tubers). In some embodiments, the compositions are applied to the roots of a plant. In some embodiments, the compositions are applied to the foliage of a plant. In some embodiments, the compositions are applied to both the roots and the foliage of a plant. In some embodiments, the compositions are applied to plant propagation materials and to the plants that grow from said plant propagation materials.

The compositions of the present disclosure may be applied to any plant growth medium, including, but not limited to, soil.

The compositions of the present disclosure may be applied to plants, plant parts and/or plant growth media in any suitable manner, including, but not limited to, on-seed application, in-furrow application and foliar application.

The compositions of the present disclosure may be applied using any suitable method(s), including, but not limited to, coating, dripping, dusting, encapsulating, immersing, spraying and soaking. Batch systems, in which predetermined batch sizes of material and composition are delivered into a mixer, may be employed. Continuous treatment systems, which are calibrated to apply composition at a predefined rate in proportion to a continuous flow of material, may also be employed.

In some embodiments, the compositions are applied directly to plant propagation material (e.g., seeds).

According to some embodiments, plant propagation materials are soaked in a composition comprising the compositions for at least 0.1, 0.2, 0.3, 0.4, 0.5, 0.6, 0.7, 0.8, 0.9, 1, 1.25, 1.5, 1.75, 2, 3, 4, 5, 6, 9, 12, 15, 18, 21, 24, 36, 48 hours. According to some embodiments, plant propagation materials are coated with the compositions. Plant propagation materials may be coated with one or more additional layers (e.g., one or more protective layers). In some embodiments, the coating comprises, consists essentially of, or consists of a composition of the present disclosure and a drying powder.

In some embodiments, the compositions are applied directly to a plant growth medium (e.g., a soil).

According to some embodiments, the compositions are applied in the vicinity of a plant propagation material (e.g., a seed). According to some embodiments, the compositions are applied to the root zone of a plant. According to some embodiments, the compositions are applied using a drip irrigation system.

In some embodiments, the compositions are applied directly to plants. According to some embodiments, the compositions are sprayed and/or sprinkled on the plant(s) to be treated.

In some embodiments, the composition comprises one or more solid carriers. According to some embodiments, the composition comprises one or more powders (e.g., wettable powders) and/or granules. Non-limiting examples of solid carriers include clays (e.g., attapulgite clays, montmorillonite clay, etc.), peat-based powders and granules, freeze-dried powders, spray-dried powders, spray-freeze-dried powders and combinations thereof. In some embodiments, the composition comprises one or more liquid and/or gel carriers. According to some embodiments, the composition comprises one or more non-aqueous solvents. According to some embodiments, the composition comprises one or more aqueous solvents (e.g., water).

Compositions of the present disclosure comprising non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (poly-ethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591. Compositions of the present disclosure comprising liquid enzyme preparations may, for instance, be stabilized by adding a polyol such as propylene glycol, a sugar or sugar alcohol, lactic acid or boric acid according to established methods. Compositions of the present disclosure comprising enzymes may be prepared according to the method disclosed in EP 238,216.

Compositions of the present disclosure may be formulated as a granule for example as a co-granule that combines one or more enzymes. Each enzyme will then be present in more granules securing a more uniform distribution of enzymes in, for example, a detergent. This also reduces the physical segregation of different enzymes due to different particle sizes.

An embodiment of the composition of the present disclosure relates to an enzyme granule/particle comprising an enzyme. The granule is composed of a core, and optionally one or more coatings (outer layers) surrounding the core.

Typically, the granule/particle size, measured as equivalent spherical diameter (volume based average particle size), of the granule is 20-2000 μm, particularly 50-1500 Lm, 100-1500 μm or 250-1200 μm.

The core may include additional materials such as fillers, fiber materials (cellulose or synthetic fibers), stabilizing agents, solubilizing agents, suspension agents, viscosity regulating agents, light spheres, plasticizers, salts, lubricants and fragrances. The core may include binders, such as synthetic polymer, wax, fat, or carbohydrate.

The core may comprise a salt of a multivalent cation, a reducing agent, an antioxidant, a peroxide decomposing catalyst and/or an acidic buffer component, typically as a homogenous blend. The core may consist of an inert particle with an enzyme absorbed into it, or applied onto the surface, e.g., by fluid bed coating. The core may have a diameter of 20-2000 μm, particularly 50-1500 μm, 100-1500 μm or 250-1200 μm.

The core can be prepared by granulating a blend of the ingredients, e.g., by a method comprising granulation techniques such as crystallization, precipitation, pan-coating, fluid bed coating, fluid bed agglomeration, rotary atomization, extrusion, prilling, spheronization, size reduction methods, drum granulation, and/or high shear granulation. Methods for preparing the core can be found in Handbook of Powder Technology; Particle size enlargement by C. E. Capes; Volume 1; 1980; Elsevier. Preparation methods include known feed and granule formulation technologies, e.g.:

a) Spray dried products, wherein a liquid enzyme-containing solution is atomized in a spray drying tower to form small droplets which during their way down the drying tower dry to form an enzyme-containing particulate material. Very small particles can be produced this way (Michael S. Showell (editor); Powdered detergents; Surfactant Science Series; 1998; vol. 71; page 140-142; Marcel Dekker).

b) Layered products, wherein the enzyme is coated as a layer around a pre-formed inert core particle, wherein an enzyme-containing solution is atomized, typically in a fluid bed apparatus wherein the pre-formed core particles are fluidized, and the enzyme-containing solution adheres to the core particles and dries up to leave a layer of dry enzyme on the surface of the core particle. Particles of a desired size can be obtained this way if a useful core particle of the desired size can be found. This type of product is described in, e.g., WO 97/23606 c) Absorbed core particles, wherein rather than coating the enzyme as a layer around the core, the enzyme is absorbed onto and/or into the surface of the core. Such a process is described in WO 97/39116.

d) Extrusion or pelletized products, wherein an enzyme-containing paste is pressed to pellets or under pressure is extruded through a small opening and cut into particles which are subsequently dried. Such particles usually have a considerable size because of the material in which the extrusion opening is made (usually a plate with bore holes) sets a limit on the allowable pressure drop over the extrusion opening. Also, very high extrusion pressures when using a small opening increase heat generation in the enzyme paste, which is harmful to the enzyme (see also Michael S. Showell (editor); Powdered detergents; Surfactant Science Series; 1998; vol. 71; page 140-142; Marcel Dekker).

e) Prilled products, wherein an enzyme-containing powder is suspended in molten wax and the suspension is sprayed, e.g., through a rotating disk atomiser, into a cooling chamber where the droplets quickly solidify (Michael S. Showell (editor); Powdered detergents; Surfactant Science Series; 1998; vol. 71; page 140-142; Marcel Dekker). The product obtained is one wherein the enzyme is uniformly distributed throughout an inert material instead of being concentrated on its surface. Also, U.S. Pat. Nos. 4,016,040 and 4,713,245 are documents relating to this technique.

f) Mixer granulation products, wherein a liquid is added to a dry powder composition of, e.g., conventional granulating components, the enzyme being introduced either via the liquid or the powder or both. The liquid and the powder are mixed and as the moisture of the liquid is absorbed in the dry powder, the components of the dry powder will start to adhere and agglomerate and particles will build up, forming granulates comprising the enzyme. Such a process is described in U.S. Pat. No. 4,106,991 and related documents EP 170360, EP 304332, EP 304331, WO 90/09440 and WO 90/09428. In a particular product of this process wherein various high-shear mixers can be used as granulators, granulates consisting of enzyme as enzyme, fillers and binders etc. are mixed with cellulose fibers to reinforce the particles to give the so-called T-granulate. Reinforced particles, being more robust, release less enzymatic dust.

g) Size reduction, wherein the cores are produced by milling or crushing of larger particles, pellets, tablets, briquettes etc. containing the enzyme. The wanted core particle fraction is obtained by sieving the milled or crushed product. Over and undersized particles can be recycled. Size reduction is described in (Martin Rhodes (editor); Principles of Powder Technology; 1990; Chapter 10; John Wiley & Sons).

h) Fluid bed granulation. Fluid bed granulation involves suspending particulates in an air stream and spraying a liquid onto the fluidized particles via nozzles. Particles hit by spray droplets get wetted and become tacky. The tacky particles collide with other particles and adhere to them and form a granule.

i) The cores may be subjected to drying, such as in a fluid bed drier. The drying preferably takes place at a product temperature of from 25 to 90° C. For some embodiments of the composition of the present disclosure comprising an enzyme it is important the cores comprising the enzyme contain a low amount of water before coating. If water sensitive enzymes are coated before excessive water is removed, it will be trapped within the core and it may affect the activity of the enzyme negatively. After drying, the cores preferably contain 0.1-10% w/w water.

The core of the enzyme granule/particle may be surrounded by at least one coating, e.g., to improve the storage stability, to reduce dust formation during handling, or for coloring the granule. The optional coating(s) may include a salt coating, or other suitable coating materials, such as polyethylene glycol (PEG), methyl hydroxy-propyl cellulose (MHPC) and polyvinyl alcohol (PVA). Examples of enzyme granules with multiple coatings are shown in WO 93/07263 and WO 97/23606.

The coating may be applied in an amount of at least 0.1% by weight of the core, e.g., at least 0.5%, 1% or 5%. The amount may be at most 100%, 70%, 50%, 40% or 30%. The coating is preferably at least 0.1 μm thick, particularly at least 0.5 μm, at least 1 μm or at least 5 μm. In a particular embodiment, the thickness of the coating is below 100 μm. In a more particular embodiment the thickness of the coating is below 60 μm. In an even more particular embodiment the total thickness of the coating is below 40 μm. In some embodiments, the coating substantially encapsulates the core unit by forming a substantially continuous layer. A substantially continuous layer is to be understood as a coating having few or no holes, so that the core unit it is encapsulating/enclosing has few or none uncoated areas. The layer or coating should in particular be homogeneous in thickness.

The coating can further contain other materials as known in the art, e.g., fillers, antisticking agents, pigments, dyes, plasticizers and/or binders, such as titanium dioxide, kaolin, calcium carbonate or talc.

A salt coating may comprise at least 60% by weight w/w of a salt, e.g., at least 65%, at least 70%, at least 75%, at least 80%, at least 85%, at least 90%, at least 95% or at least 99% by weight w/w. The salt may be added from a salt solution where the salt is completely dissolved or from a salt suspension wherein the fine particles is less than 50 μm, such as less than 10 μm or less than 5 μm. The salt coating may comprise a single salt or a mixture of two or more salts. The salt may be water soluble, in particular having a solubility at least 0.1 grams in 100 g of water at 20° C., preferably at least 0.5 g per 100 g water, e.g., at least 1 g per 100 g water, e.g., at least 5 g per 100 g water.

The salt may be an inorganic salt, e.g., salts of sulfate, sulfite, phosphate, phosphonate, nitrate, chloride or carbonate or salts of simple organic acids (less than 10 carbon atoms, e.g., 6 or less carbon atoms) such as citrate, malonate or acetate. Examples of cations in these salts are alkali or earth alkali metal ions, the ammonium ion or metal ions of the first transition series, such as sodium, potassium, magnesium, calcium, zinc or aluminum.

Examples of anions include chloride, bromide, iodide, sulfate, sulfite, bisulfite, thiosulfate, phosphate, monobasic phosphate, dibasic phosphate, hypophosphite, dihydrogen pyrophosphate, tetraborate, borate, carbonate, bicarbonate, metasilicate, citrate, malate, maleate, malonate, succinate, lactate, formate, acetate, butyrate, propionate, benzoate, tartrate, ascorbate or gluconate. In particular, alkali- or earth alkali metal salts of sulfate, sulfite, phosphate, phosphonate, nitrate, chloride or carbonate or salts of simple organic acids such as citrate, malonate or acetate may be used.

The salt in the coating may have a constant humidity at 20° C. above 60%, particularly above 70%, above 80% or above 85%, or it may be another hydrate form of such a salt (e.g., anhydrate). The salt coating may be as described in WO 00/01793 or WO 2006/034710.

Specific examples of suitable salts are NaCl ($CH_{20° C.}$=76%), $Na_2CO_3$ ($CH_{20° C.}$=92%), $NaNO_3$ ($CH_{20° C.}$=73%), $Na_2HPO_4$ ($CH_{20° C.}$=95%), $Na_3PO_4$ ($CH_{20° C.}$=92%), $NH_4Cl$ ($CH_{20° C.}$=79.5%), $(NH_4)_2HPO_4$ ($CH_{20° C.}$=93.0%), $NH_4H_2PO_4$ ($CH_{20° C.}$=93.1%), $(NH_4)_2SO_4$($CH_{20° C.}$=81.1%), KCl ($CH_{20° C.}$=85%), $K_2HPO_4$ ($CH_{20° C.}$=92%), $KH_2PO_4$ ($CH_{20° C.}$=96.5%), $KNO_3$ ($CH_{20° C.}$=93.5%), $Na_2SO_4$($CH_{20° C.}$=93%), $K_2SO_4$ ($CH_{20° C.}$=98%), $KHSO_4$ ($CH_{20° C.}$=86%), $MgSO_4$ ($CH_{20° C.}$=90%), $ZnSO_4$ ($CH_{20° C.}$=90%) and sodium citrate ($CH_{20° C.}$=86%). Other examples include $NaH_2PO_4$, $(NH_4)$ $H_2PO_4$, $CuSO_4$, $Mg(NO_3)_2$ and magnesium acetate.

The salt may be in anhydrous form, or it may be a hydrated salt, i.e. a crystalline salt hydrate with bound water(s) of crystallization, such as described in WO 99/32595. Specific examples include anhydrous sodium sulfate ($Na_2SO_4$), anhydrous magnesium sulfate ($MgSO_4$), magnesium sulfate heptahydrate ($MgSO_4·7H_2O$), zinc sulfate heptahydrate ($ZnSO_4·7H_2O$), sodium phosphate dibasic heptahydrate ($Na_2HPO_4·7H_2O$), magnesium nitrate hexahydrate ($Mg(NO_3)_2(6H_2O)$), sodium citrate dihydrate and magnesium acetate tetrahydrate. Preferably the salt is applied as a solution of the salt, e.g., using a fluid bed.

Thus, in a further aspect, a composition used in the methods of the present disclosure comprises a granule, which comprises: (a) a core comprising an enzyme, and (b) optionally a coating consisting of one or more layer(s) surrounding the core.

In some embodiments, compositions of the present disclosure are applied at a rate of about 0.5 to about 100 milliliters and/or grams of composition per plant. According to some embodiments, one or more compositions of the present disclosure is/are applied in an amount sufficient to ensure each plant is treated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of composition. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5 milliliters and/or grams of composition is applied to each plant.

In some embodiments, compositions of the present disclosure are applied at a rate of about 0.5 to about 100 milliliters and/or grams of composition per acre of treated crops. According to some embodiments, one or more compositions of the present disclosure is/are applied in an amount sufficient to ensure each acre of treated crops is treated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of composition. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5 milliliters and/or grams of composition is applied to each acre of treated crops.

In some embodiments, compositions of the present disclosure are applied at a rate of about 0.5 to about 100 milliliters and/or grams of composition per acre of plant growth media. According to some embodiments, one or more compositions of the present disclosure is/are applied in an amount sufficient to ensure each acre of plant growth media is treated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of composition. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 10, 20, 30, 40, 50, 100, 500, 1,000, 5,000, or 10,000 milliliters and/or grams of composition is applied to each acre of plant growth media.

In some embodiments, compositions of the present disclosure are applied 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and/or 100 or more days after planting.

In some embodiments, the composition comprises an enzyme derived from a strain selected from the group *Alicyclobacillus, Arthrobacter, Aspergillus* (such as *Aspergillus oryzae*), *Bacillus* (such as, *Bacillus amyloliquefaciens, Bacillus clausii, Bacillus lichemformis, Bacillus mojavensis,* and *Bacillus pumilus*), *Dichomitus squalens, Fusarium oxysporum, Janibacter, Lysobacter, Meripilus giganteus, Nocardiopsis prasina, Pyrococcus furiosus, Rhizomucor miehei, Saccharomonospora viridis, Saccharothrix australiensis, Saccharothrix variisporea, Streptomyces* (such as *Streptomyces violaceoruber*), *Streptosporangium albidum, Thermoascus aurantiacus, Trichoderma reesei,* and *Zophobas atratus.*

The crops of useful plants to be protected by the present invention typically comprise, for example, the following species of plants: cereals, for example wheat, barley, rye, oats, rice, maize or sorghum; beet, for example sugar or fodder beet; fruit, for example pome fruit, stone fruit and soft fruit, for example apples, pears, plums, peaches, almonds, cherries or berries, for example strawberries, raspberries and blackberries; legumes, for example beans, lentils, peas or soya beans, oil crops, for example oilseed rape, mustard, poppies, olives, sunflowers, coconut, castor-oil plants, cacao or peanuts; cucurbits, for example pumpkins, cucumbers or melons; fiber plants, for example cotton, flax, hemp or jute; citrus fruit, for example oranges, lemons, grapefruit or mandarins; vegetables, for example spinach, lettuce, asparagus, brassica (e.g. cabbage, broccoli, and cauliflower), carrots, onions, tomatoes, potatoes or capsicums; Lauraceae, for example avocado, Cinnamonium or camphor, or tobacco, nuts, coffee, egg plants, sugar cane, tea, pepper, grapevines, hops, Musaceae, latex plants or ornamentals (such as houseplants used in outdoor gardening or landscaping).

Crops are to be understood as including those which are naturally occurring, obtained by conventional methods of breeding, or obtained by genetic engineering. They include crops which contain so-called output traits (e.g. improved storage stability, higher nutritional value and improved flavor). Crops are to be understood as also including those crops which have been rendered tolerant to herbicides like bromoxynil or classes of herbicides such as ALS-, EPSPS-, GS-, HPPD- and PPO-inhibitors, including e.g. glyphosate- and glufosinate-resistant maize varieties. Crops are also to be understood as include those which naturally are or have been rendered resistant to particular insects, but not others. This includes plants transformed by the use of recombinant DNA techniques, for example, to be capable of synthesizing one or more selectively acting toxins, such as are known, for example, from toxin-producing bacteria. Examples of toxins which can be expressed include S-endotoxins, vegetative insecticidal proteins, insecticidal proteins of bacteria colonizing nematodes, and toxins produced by scorpions, arachnids, wasps and fungi. Crops or seed material thereof can also be resistant to multiple types of pests (so-called stacked transgenic events when created by genetic modification).

The present invention can be used to protect a plant against pests, including those:

of the order Lepidoptera, for example, *Acleris* spp., *Adoxophyes* spp., *Aegeria* spp., *Agrotis* spp., *Alabama argillaceae, Amylois* spp., *Anticarsia gemmatalis, Archips* spp., *Argyrotaenia* spp., *Astylus atromaculatus, Autographa* spp., *Busseola fusca, Cadra cautella, Carposina nipponensis, Chilo* spp., *Choristoneura* spp., *Clysia ambiguella, Cnaphalocrocis* spp., *Cnephasia* spp., *Cochylis* spp., *Coleophora* spp., *Crocidolomia binotalis, Cryptophlebia leucotreta, Cydia* spp., *Diatraea* spp., *Diparopsis castanea, Earias* spp., *Elasmopalpus* spp., *Ephestia* spp., *Eucosma* spp., *Eupoecilia ambiguella, Euproctis* spp., *Euxoa* spp., *Grapholita* spp., *Hedya nubiferana, Heliothis* spp., *Hellula undalis, Heteronychus arator, Hyphantria cunea, Keiferia lycopersicella, Leucoptera scitella, Lithocollethis* spp., *Lobesia botrana, Lymantria* spp., *Lyonetia* spp., *Malacosoma* spp., *Mamestra brassicae, Manduca sexta, Operophtera* spp., *Ostrinia nubilalis, Pammene* spp., *Pandemis* spp., *Panolis flammea, Pectinophora gossypiella, Phthorimaea operculella, Pieris rapae, Pieris* spp., *Plutella xylostella, Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusia ni* and *Yponomeuta* spp.; of the order Coleoptera, for example, *Agriotes* spp., *Anthonomus* spp., *Atomaria linearis, Chaetocnema tibialis, Conotrachelus* spp., *Cosmopolites* spp., *Curculio* spp., *Dermestes* spp., *Diabrotica* spp., *Dilopoderus* spp., *Epilachna* spp., *Eremnus* spp., *Heteronychus* spp., *Leptinotarsa decemlineata, Lissorhoptrus* spp., *Melolontha* spp., *Orycaephilus* spp., *Otiorhynchus* spp., *Phlyctinus* spp., *Popillia* spp.,

*Psylliodes* spp., *Rhizopertha* spp., *Scarabeidae*, *Somaticus* spp., *Sitophilus* spp., *Sitotroga* spp., *Tanymecus* spp., *Tenebrio* spp., *Tribolium* spp., *Trogoderma* spp. and *Zabrus* spp.;

of the order Orthoptera, for example, *Blatta* spp., *Blattella* spp., *Gryllotalpa* spp., *Leucophaea maderae*, *Locusta* spp., *Periplaneta* spp. and *Schistocerca* spp.;

of the order Psocoptera, for example *Liposcelis* spp.;

of the order Anoplura, for example, *Haematopinus* spp., *Linognathus* spp., *Pediculus* spp., *Pemphigus* spp. und *Phylloxera* spp.;

of the order Isoptera, for example, *Reticulitermes* spp.;

of the order Mallophaga, for example, *Damalinea* spp. and *Trichodectes* spp.;

of the order Thysanoptera, for example, *Frankliniella* spp., *Hercinothrips* spp., *Taeniothrips* spp., *Thrips palmi*, *Thrips tabaci* and *Scirtothrips aurantii*;

of the order Heteroptera, for example, *Cimex* spp., *Distantiella theobroma*, *Dysdercus* spp., *Euchistus* spp. *Eurygaster* spp. *Leptocorisa* spp., *Nezara* spp., *Piesma* spp., *Rhodnius* spp., *Sahlbergella singularis*, *Scotinophara* spp. and *Thatoma* spp.;

of the order Homoptera, for example, *Aleurothrixus floccosus*, *Aleyrodes brassicae*, *Aonidiella* spp., *Aphididae*, *Aphis* spp., *Aspidiotus* spp., *Bemisia tabaci*, *Ceroplaster* spp., *Chrysomphalus aonidium*, *Chrysomphalus dictyospermi*, *Coccus hesperidum*, *Empoasca* spp., *Eriosoma la gerum*, *Erythroneura* spp., *Gascardia* spp., *Laodelphax* spp., *Lecanium corni*, *Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica*, *Quadraspidiotus* spp., *Rhopalosiphum* spp., *Saissetia* spp., *Scaphoideus* spp., *Schizaphis* spp., *Sitobion* spp., *Trialeurodes vaporariorum*, *Trioza erytreae* and *Unaspis citri*; of the order Hymenoptera, for example, *Acromyrmex*, *Atta* spp., *Cephus* spp., *Diprion* spp., *Diprionidae*, *Gilpinia polytoma*, *Hoplocampa* spp., *Lasius* spp., *Monomorium pharaonis*, *Neodiprion* spp., *Solenopsis* spp. and *Vespa* spp.;

of the order Diptera, for example, *Aedes* spp., *Anthe gona soccata*, *Bibio hortulanus*, *Calliphora erythrocephala*, *Ceratitis* spp., *Chrysomyia* spp., *Culex* spp., *Cuterebra* spp., *Dacus* spp., *Drosophila melanogaster*, *Fannia* spp., *Gastrophilus* spp., *Glossina* spp., *Hypoderma* spp., *Hyppobosca* spp., *Liriomyza* spp., *Lucilia* spp., *Melanagromyza* spp., *Musca* spp., *Oestrus* spp., *Orseolia* spp., *Oscinella frit*, *Pegomyia hyoscyami*, *Phorbia* spp., *Rhagoletis pomonella*, *Sciara* spp., *Stomoxys* spp., *Tabanus* spp., *Tannia* spp. and *Tipula* spp.;

of the order Siphonaptera, for example, *Ceratophyllus* spp. and *Xenopsylla cheopis*; or of the order Thysanura, for example, *Lepisma saccharina*.

In some embodiments, compositions of the present invention comprise one or more pesticides listed in Glossary of Pesticide Chemicals, published June 2005, by the United States Food and Drug Administration.

In some embodiments, compositions of the present invention comprise one or more pesticides, including, but not limited to, 4-[(5S)-5-(3,5-dichlorophenyl)-5-(trifluoromethyl)-4H-isoxazol-3-yl]-2-methyl-N-(thietan-3-yl)benzamide, 4-[(5R)-5-(3,5-dichlorophenyl)-5-(trifluoromethyl)-4H-isoxazol-3-yl]-2-methyl-N-(thietan-3-yl)benzamide, 4-[(5S)-5-(3,5-dichlorophenyl)-5-(trifluoromethyl)-4H-isoxazol-3-yl]-2-methyl-N-(cis-1-oxo-thietan-3-yl)benzamide, 4-[(5R)-5-(3,5-dichlorophenyl)-5-(trifluoromethyl)-

4H-isoxazol-3-yl]-2-methyl-N-(cis-1-oxo-thietan-3-yl)benzamide, 4-[(5S)-5-(3,5-dichlorophenyl)-5-(trifluoromethyl)-4H-isoxazol-3-yl]-2-methyl-N-(trans-oxo-thietan-3-yl)benzamide, 4-[(5R)-5-(3,5-dichlorophenyl)-5-(trifluoromethyl)-4H-isoxazol-3-yl]-2-methyl-N-(tram-1-oxo-thietan-3-yl)benzamide, 4-[(5S)-5-(3,5-dichlorophenyl)-5-(trifluoromethyl)-4H-isoxazol-3-yl]-N-(1,1-dioxothietan-3-yl)-2-methyl-benzamide, 4-[(5R)-5-(3,5-dichlorophenyl)-5-(trifluoromethyl)-4H-isoxazol-3-yl]-N-(1,1-dioxothietan-3-yl)-2-methyl-benzamide, 4-[(5S)-5-(3,5-dichlorophenyl)-5-(trifluoromethyl)-4H-isoxazol-3-yl]-2-methyl-N-[2-oxo-2-(2,2,2-trifluoroethylamino)ethyl]benzamide, 4-[(5R)-5-(3,5-dichlorophenyl)-5-(trifluoromethyl)-4H-isoxaol-3-yl]-2-methyl-N-[2-oxo-2-(2,2,2-trifluoroethylamino)ethyl]benzamide, 5-[(5S)-5-(3,5-dichlorophenyl)-5-(trifluoromethyl)-4H-isoxazol-3-yl]-2-(1,2,4-triazol-1-yl)benzonitrile, 5-[(5R)-5-(3,5-dichlorophenyl)-5-(trifluoromethyl)-4H-isoxazol-3-yl]-2-(1,2,4-triazol-1-yl)benzonitrile, abamectin, acephate, acequinocyl, acetamiprid, acetoprole, acrinathrin, alanycarb, aldicarb, aldoxycarb, aldrin, allethrin, allyxycarb, alphamethrin, aminocarb, amitraz, anisopliae, azadirachtin, azamethiphos, azinphos-ethyl, azinphos-methyl, azocyclotin, *Bacillus thuringiensis*, bendiocarb, benfuracarb, bensultap, beta-cyfluthrin, bifenazate, bifenthrin, binapacryl, bioallethrin, bioallethrin (S)-cyclopentenyl isomer, bioethanomethrin, biopermethrin, bioresmethrin, bromfenvinfos, bromophos, bromophos-ethyl, bufencarb, buprofezin, bistrifluron, butacarb, butathiofos, butocarboxim, butoxycarboxim, byfenthrin, cadusafos, calcium polysulphide, camphechlor, carbaryl, carbofuran, carbophenothion, carbosulfan, cartap, chlordane, chlorantraniliprole, chlorethoxyfos, chlorfenapyr, chlorfenvinphos, chlorfluazuron, chlormephos, chloropicrin, chlorpyrifos, chromafenozide, clothianidin, cis-cypermethrin, cis-resmethrin, cis-permethrin, clocythrin, cloethocarb, clofentezine, coumaphos, cryolite, cyanofenphos, cyanophos, cyantraniliprole, cycloprothrin, cyenopyrafen, cyflumetofen, cyfluthrin, beta-cyfluthrin, cyhalothrin, cyhexatin, alpha-cyophenothrin, cypermethrin, cyphenothrin, cyromazine, dazomet, DDT, decamethrin, deltamethrin, demeton, demeton-S-methyl, demeton-S-methylsulphone, deoxabenzofos, diafenthiuron, dialifos, diazacarb, diazinon, dichlofenthion, dichlorvos, dicrotophos, diflubenzuron, dimethoate, dimethylvinphos, dimetilan, dinobuton, dinocap, dinoseb, dinotefuran, diofenolan, dioxabenzofos, disulfoton, eflusilanat, emamectin, emamectin benzoate, empenthrin, endosulfan, EPN, epofenonane, esfenvalerate, ethiofencarb, ethion, ethiprole, ethoate, ethoprophos, etofenprox, etoxazole, etrimfos, famphur, fenamiphos, fenazaquin, fenbutatin oxide, fenfluthrin, fenitrothion, fenobucarb, fenothiocarb, fenoxycarb, fenpropathrin, fenpyrithrin, fenpyroximate, fensulfothion, fenthion, fenvalerate, fipronil, flonicamid, fluacrypyrim, fluazuron, flubendiamide, flubrocythrinate, flucycloxuron, flucythrinate, flufenoxuron, flufenprox, flumethrin, flupyrazofos, fluvalinate, fonofos, formetamate, formothion, fosmethilan, fosthiazate, fubfenprox, fufenozide, furathiocarb, gamma-cyhalothrin, halofenozide, heptachlor, heptenophas, heptenophos, hexaflumuron, hexythiazox, hydramethylnon, hydrogen cyanide, hydroprene, imicyafos, imidacloprid, imidaclothiz, imiprothrin, indoxacarb, iodfenphos, iprobenfos, isazofos, isofenphos, isoprocarb, isopropyl, isoprothiolane, isoxathion, ivermectin, kadethrin, kinoprenejambda-cyhalothrin, lepimectin, lindane, lufenuron, malathion, mecarbam, mephosfolan, mercurous chloride, metaflumizone, metam, metam-sodium, metarthizium, methacrifos, methamidophos, methidathion, methiocarb, methomyl, methoprene, methoxychlor, methoxyfenozide, methyl bromide, methyl isothiocyanate, metholcarb, metofluthrin, mevinphos, milbemectin, monocrotophos, naled, nicotine, nitenpyram, nithiazine, novaluron, novi-flumuron, omethoate, 0-salicylate, oxamyl, oxydemeton-methyl, parathion, parathion-methyl, penfluron, permethrin, pentachlorophenol, petroleum oils, phenothrin, phenthoate, phorate, phosalone, phosmet, phosphamidon, phosphine, phosphocarb, phoxim, pirimicarb, pirimiphos, pirimiphos-ethyl, pirimiphos-methyl, poxim, prallethrin, profenofos, profluthrin, promecarb, propaphos, propargite, propetamphos, propoxur, prothiofos, prothoate, protrifenbute, pymetrozine, pyraclofos, pyrafluprole, pyrethrin, pyrethrum, pyridaben, pyridafenthion, pyridathion, pyrifluquinazon, pyrimidifen, pyriprole, pyriproxyfen, quinalphos, quinomethionate, resmethrin, rotenone, silafluofen, sebufos, sodium fluoride, sodium hexafluorosilicate, spinosad, spinetoram, spirodiclofen, spiromesifen, spirotetramat, sulfotep, sulfuiryl fluoride, sulprofos, tar oils, tau-fluvalinate, tebufenozide, tebufenpyrad, tebupirimfos, teflubenzuron, tefluthrin, temephos, terallethrin, terbufos, tetrachlorvinphos, tetradifon, tetramethrin, thiacloprid, thiamethoxam, thiocylam, thiodicarb, thiofanox, thiometon, thiosultap-sodium, tralomethrin, transfluthrin, triazophos, trichlorphon, triflumuron, trimethacarb, triprene, tolfenpyrad, vamidothion, verticillium lacanii, vaniliprole, and/or xylylcarb. Pesticides can be grouped together according to their chemical class or mode of action. For example, groups include avermectins which includes abamectin and emamectin benzoate, neonicotinoids which includes acetamiprid, clothianidin, dinotefuran, imidacloprid, imidaclothiz, nitenpyram, nithiazine, thiacloprid and thiamethoxam, pyrethroids which includes cyfluthrins, cyhalothrins, cypermethrins, deltamethrin, fenfluthrin, permethrin and tefluthrin and diamides which includes chlorantraniliprole, cyantraniliprole and flubendiamide.

In other embodiments, compositions of the present invention comprise one or more insecticides, including, but not limited to, 2,4 Dimethylphenyl formamide (DMPF), acephate, acetamiprid, aldicarb sulfone, aldicarb sulfoxide, bifenthrin, chlorpyrifos, coumaphos, coumaphos oxon, cyfluthrin, cyhalothrin, cypermethrin, diazinon, dichlorvos, dicofol, dieldrin, diflubenzuron, endosulfan I, endosulfan II, endosulfan sulfate, esfenvalerate, fenpropathrin, fenpyroximate, flonicamid, flubendiamide, fluvalinate, imidacloprid, methoxyfenozide, methamidophos, methomyl, paradichlorobenzene, permethrin, phosmet, pyridaben, tebufenozide, thiacloprid, thymol, thiamethoxam, spirotetramat.

IRAC Grouping of Compounds

In some embodiments, compositions of the present invention comprise one ore more pesticides or other substances that may also be described or categorized by IRAC (Insecticide Resistance Action Committee) mode of action classification (http://www.irac-online.org/modes-of-action/). The IRAC categories or groupings include:

1) Acetylcholinestrase (ACHE) inhibitors, including A) carbamates; and B) organophosphates;
2) GABA-gated chloride channel blockers, including A) cyclodiene organochlorines; and B) phenylpyrazoles (fiproles);
3) Sodium channel modulators, including A) pyrethroids, pyrethrins; and B) DDT, methoxychlor,
4) Nicotinic acetylcholine receptor (NACHR) competitive modulators, including A) neonicotinoids; B) nicotine; C) sulfoximines; D) butenolides; and E) mesoionics;
5) Nicotinic acetylcholine receptor (NACHR) allosteric modulators, including A) spinosyns;
6) Glutamate-gated chloride channel (GLUCL) allosteric modulators, including A) avermectins, milbemycins;
7) Juvenile hormone mimics, including A) juvenile hormone analogues; B) fenoxycarb; and C) pyriproxyfen;
8) Miscellaneous non-specific (multi-site) inhibitors, including A) akyl halides; B) chloropicrin; C) fluorides; D) borates; E) tartar emetic; and F) methyl isothiocyanate generators;
9) Chorodotonal organ TRPV channel modulators, including A) pyridine azomethine derivatives;
10) Mite growth inhibitors, including A) clofentezine, diflovidazin, hexythiazox; and B) etoxazole;
11) Microbial disruptors of insect midgut membranes, including A) *Bacillus thuringiensis* and the insecticidal proteins they produce; and B) and *Bacillus sphaericus;*
12) Inhibitors of mitochondrial ATP synthase, including A) diafenthiuron; B) organotin miticides; C) propargite; and D) tetradifon;
13) Uncouplers of oxidative phosphorylation via disruption of the protein gradient, including A) chlorfenapyr, DNOC and sulfuramid;
14) Nicotinic acetylcholine receptor (NACHR) channel blockers, including nereistoxin analogs;
15) Inhibitors of chitin biosynthesis, Type 0, including A) benzoylureas;
16) Inhibitors of chitin biosynthesis, Type 1, including A) buprofezin;
17) Moulting disrupter, dipteran, including A) cyromazine;
18) Ecdysone receptor agonists, including A) diacylhydrazines;
19) Octopamine receptor agonists, including A) amitraz;
20) Mitochondrial complex III electron transport inhibitors, including A) hydramethylnon; B) acequinocyl; C) fluacrypyrim; and D) bifenazate;
21) Mitochondrial complex III electron transport inhibitors, including A) meti acaricides and insecticides; and B) rotenone;
22) Voltage-dependent sodium channel blockers, including A) oxadiazines; and B) semicarbazones;
23) Inhibitors of Acetyl CoA carboxylase, including A) tetronic and tetramic acid derivatives;
24) Mitochondrial complex IV electron transport inhibitors, including A) phosphides; and B) cyanides;
25) Mitochondrial complex II electron transport inhibitors, including A) beta-ketonitrile derivatives; and B) carboxanilides;
28) Ryanodine receptor modulators, including A) diamides;
29) Chordotonal organ modulators—undefined target site, including A) flonicamid; and UN) Compounds of unknown or uncertain MOA, including A) azadirachtin; B) benzoximate; C) bromopropylate; D) chinomethionat; E) dicofol; F) GS-omega/kappa HXTX-Hv1a peptide; G) lime sulfur, H) pyridalyl; and I) sulfur.

In some embodiments, compositions of the present invention comprise a fungicide comprising one or more strobilurins, such as azoxystmbin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2 [2-(2,5-dimethyl-phenoxymethyl)-phenyl]-3-methoxy-acrylic acid methyl ester and 2 (2-(3-(2,6-dichlorophenyl)-1-methyl-allylideneaminooxymethyl)-phenyl)-2-methoxyimino-N-methyl-acetamide; carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, oxytetracyclin, silthiofam and N-(6-methoxy-pyridin-3-yl) cyclopropanecarboxylic acid amide; azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf.Dlb), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pirroles (e.g., fenpiclonil, fludioxonil), morpholines (e.g., aldimorph, dodemorph, dodemorph-acetate, fenpropimorph, tridemorph), piperidines (e.g., fenpropidin), dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propylchromen4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A); nitrophenyl derivates (e.g., binapacryl, dicloran, dinobuton, dinocap, nitrothal-isopropyl, tecnazen); organometal compounds (e.g., fentin salts, such as fentin-acetate, fentin chloride, fentin hydroxide); sulfur-containing heterocyclyl compounds (e.g., dithianon, isoprothiolane); organophosphorus compounds (e.g., edifenphos, fosetyl, fosetyl-aluminum, iprobenfos, phosphorus acid and its salts, pyrazophos, tolclofos-methyl); organochlorine compounds (e.g., chorothalonil, dichlofluanid, dichlorophen, flusulfamide, hexachlorobenzene, pencycuron, pentachlorphenole and its salts, phthalide, quintozene, thiophanate-methyl, thiophanate, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In some embodiments, compositions of the present disclosure comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole. In some embodiments, compositions of the present disclosure comprise azoxystrobin, pyraclostrobin, fluoxastrobin, trifloxystrobin, ipconazole, prothioconazole, sedaxane, fludioxonil, metalaxyl, mefenoxam, thiabendazole, fluxapyroxad and/or fluopyram. In some embodiments, compositions of the present disclosure comprise one or more aromatic hydrocarbons, benzimidazoles, o, carboxamides, carboxylic acid amides, morpholines, phenylamides, phosphonates, quinone outside inhibitors (e.g. strobilurins), thiazolidines, thiophanates, thiophene carboxamides and/or triazoles.

The present invention is further described by the following numbered paragraphs:

Paragraph [1]. A method comprising foliar application of a composition comprising an effective amount of a phytoprotective agent to a plant and/or plant part.

Paragraph [2]. A method of controlling plant pests in a plant or plant part and/or inducing resistance to a plant pest in a plant or plant part, comprising applying an effective amount of a composition comprising a phytoprotective agent to the plant or plant part.

Paragraph [3]. The method of controlling or preventing pest damage in a plant propagation material, a plant, part of a plant and/or plant organ, comprising applying on the plant, part of the plant, plant organ, plant propagation material or a surrounding area thereof an effective amount of a composition comprising a phytoprotective agent.

Paragraph [4]. The method of any one of paragraphs 1-3, wherein the phytoprotective agent comprises an enzyme, optionally having protease, chitinase, lipase, and/or cutinase activity.

Paragraph [5]. The method of any one of paragraphs 1-3, wherein the phytoprotective agent comprises a polypeptide having at least 70%, 75%, 80%, 81%, 82%, 83%, 84%, 85%, 86%, 87%, 88%, 89%, 90%, 91%, 92%, 93%, 94%, 95%, %%, 97%, 97.5%, 98% 98.5%, 99%, 99.5%, or 100% sequence identity with a sequence selected from the group SEQ ID NO: 1.

Paragraph [6]. The method of any one of paragraphs 1-3, wherein the phytoprotective agent comprises:

a. an enzyme, optionally derived from a strain selected from the group *Alicyclobacillus, Arthrobacter, Aspergillus oryzae, Bacillus* (such as, *Bacillus amyloliquefaciens, Bacillus clausii, Bacillus licheniformis, Bacillus mojavensis,* and *Bacillus pumilus*), *Dichomitus squalens, Fusarium oxysporum, Janibacter, Lysobacter, Meripilus giganteus, Nocardiopsis prasina, Pyrococcus furiosus, Rhizomucor miehei, Saccharomonospora viridis, Saccharothrix australiensis, Saccharothrix variisporea, Streptomyces* (such as *Streptomyces violaceoruber*), *Streptosporangium albidum, Thermoascus aurantiacus, Trichoderma reesei,* and *Zophobas atratus*; and b. an insecticide, optionally one or more avermectins (such as abamectin and/or emamectin benzoate), neonicotinoids (such as acetamiprid, clothianidin, dinote-
furan, imidacloprid, imidaclothiz, nitenpyram, nithiaz-
ine, thiacloprid and/or thiamethoxam), pyrethroids
(such as cyfluthrins, cyhalothrins, cypermethrins, del-
tamethrin, fenfluthrin, permethrin and/or tefluthrin),
and/or diamides (such as chlorantraniliprole, cyantra-
niliprole and/or flubendiamide), optionally one or more
acaricides, carbamates, macrocyclic lactones, nemati-
cides, organophosphates, phenylpyrazoles, spinosyns,
tetronic acids and/or tetramic acids Paragraph [7]. The method of any one of paragraphs 1-6,
wherein the phytoprotective agent further comprises one or
more fungicides, optionally one or more carbamates,
diamides, macrocyclic lactones, neonicotinoids, organo-
phosphates, phenylpyrazoles, pyrethrins, spinosyns, syn-
thetic pyrethroids, tetronic acids and/or tetramic acids aro-
matic hydrocarbons, benzimidazoles, benzothiadiazole,
carboxamides, carboxylic acid amides, morpholines, phe-
nylamides, phosphonates, quinone outside inhibitors, thi-
azolidines, thiophanates, thiophene carboxamides and/or
triazoles.

Paragraph [8]. The method of any one of paragraphs 2-7,
wherein the plant part is selected from the group: foliage,
anthers, embryos, flowers, fruits, fruiting bodies, leaves,
ovules, pollen, rhizomes, roots, seeds, shoots, stems, tubers,
scions, rootstocks, protoplasts, and calli.

Paragraph [9]. The method of any one of paragraphs 1-8,
wherein the phytoprotective agent is in an amount/concen-
tration of about 0.0001 to about 95% or more (by weight) of
the composition, for example about 0.0001, 0.0002, 0.0003,
0.0004, 0.0005, 0.0006, 0.0007, 0.0008, 0.0009, 0.001,
0.0015, 0.002, 0.0025, 0.003, 0.0035, 0.004, 0.0045, 0.005,
0.0055, 0.006, 0.0065, 0.007, 0.0075, 0.008, 0.0085, 0.009,
0.0095, 0.01, 0.015, 0.02, 0.025, 0.03, 0.035, 0.04, 0.045,
0.05, 0.06, 0.07, 0.08, 0.09, 0.1, 0.02, 0.3, 0.4, 0.5, 0.6, 0.7,
0.8, 0.9, 1 to about 1, 1.1, 1.2, 1.3, 1.4, 1.5, 1.6, 1.7, 1.8, 1.9,
2, 2.1, 2.2, 2.3, 2.4, 2.5, 2.6, 2.7, 2.8, 2.9, 3, 3.1, 3.2, 3.3, 3.4,
3.5, 3.6, 3.7, 3.8, 3.9, 4, 4.1, 4.2, 4.3, 4.4, 4.5, 4.6, 4.7, 4.8,
4.9, 5, 10, 15, 20, 25, 30, 35, 40, 45, 50, 55, 60, 65, 70, 75,
80, 85, 90, 95%. (by weight) of the composition.

Paragraph [10]. The method of any one of paragraphs 1-9,
wherein the composition further comprises an agriculturally
acceptable carrier, for example, a foliar-compatible carrier,
a seed-compatible carrier, and/or a soil-compatible carrier,
wherein the carrier comprises a liquid, gel, slurry, or solid,
optionally:

one or more monosaccharides, optionally arabinose, fruc-
        tose and/or glucose;
    one or more disaccharides, optionally maltose, sucrose
        and/or trehalose;
    one or more maltodextrins, optionally one or more malto-
        dextrins (e.g., one or more maltodextrins (each and/or
        collectively) having a DEV value of about 15 to about
        20;
    one or more sugar alcohols, optionally arabitol, mannitol,
        sorbitol and/or xylitol;
    one or more humic acids, optionally potassium humate
        and/or sodium humate;
    one or more fulvic acids, optionally potassium fulvate
        and/or sodium fulvate;
    one or more hygroscopic polymers, optionally one or
        more albumins, alginates, celluloses, gums (e.g., cel-
        lulose gum, guar gum, gum arabic, gum combretum,
        xantham gum), methyl celluloses, nylons, pectins,
        polyacrylic acids, polycarbonates, polyethylene glycols
        (PEG), polyethylenimines (PEI), polylactides, polym-
        ethylacrylates (PMA), polyurethanes, polyvinyl alcohols (PVA), polyvinylpyrrolidones (PVP), propylene
glycols, sodium carboxymethyl celluloses and/or
starches;

one or more oxidation control components, optionally one
    or more antioxidants (e.g., ascorbic acid, ascorbyl
    palmitate, ascorbyl stearate, calcium ascorbate, one or
    more carotenoids, lipoic acid, one or more phenolic
    compounds (e.g., one or more flavonoids, flavones
    and/or flavonols), potassium ascorbate, sodium ascor-
    bate, one or more thiols (e.g., glutathione, lipoic acid
    and/or N-acetyl cysteine), one or more tocopherols, one
    or more tocotrienols, ubiquinone and/or uric acid)
    and/or one or more oxygen scavengers, optionally
    ascorbic acid and/or sodium hydrogen carbonate; and/
    or one or more UV protectants, optionally one or more
    lignosulfites.

Paragraph [11]. The method of any one of paragraphs
1-10, wherein the composition further comprises one or
more gastropodicides, optionally one or more iron phos-
phates, metaldehydes, methiocarbs and/or salts;

one or more herbicides, optionally one or more acetyl
        CoA carboxylase (ACCase) inhibitors, acetolactate
        synthase (ALS) inhibitors, acetohydroxy acid synthase
        (AHAS) inhibitors, photosystem II inhibitors, photo-
        system I inhibitors, protoporphyrinogen oxidase (PPO
        or Protox) inhibitors, carotenoid biosynthesis inhibi-
        tors, enolpyruvyl shikimate-3-phosphate (EPSP) syn-
        thase inhibitor, glutamine synthetase inhibitor, dihy-
        dropteroate synthetase inhibitor, mitosis inhibitors,
        4-hydroxyphenyl-pyruvate-dioxygenase (4-HPPD)
        inhibitors, synthetic auxins, auxin herbicide salts, auxin
        transport inhibitors, and/or nucleic acid inhibitors;
    one or more rodenticides, optionally brodifacoum, bro-
        madiolone, bromethalin, cholecalciferol, chlorophaci-
        none, difethialone, diphacinone, strychnine, warfarin
        and/or zinc phosphide; and/or
    one or more virucides.

Paragraph [12]. The method of any one of paragraphs
1-11, wherein the composition further comprises one or
more flavonoids, optionally:

one or more anthocyanidins, optionally cyanidin, del-
        phinidin, malvidin, pelargonidin, peonidin and/or
        petunidin;
    one or more anthoxanthins, optionally one or more fla-
        vones, such as apigenin, baicalein, chrysin, 7,8-dihy-
        droxyflavone, diosmin, flavoxate, 6-hydroxyflavone,
        luteolin, scutellarein, tangeritin and/or wogonin; and/or
        flavonols, such as amurensin, astragalin, azaleatin, aza-
        lein, fisetin, furanoflavonols galangin, gossypetin,
        3-hydroxyflavone, hyperoside, icariin, isoquercetin,
        kaempferide, kaempferitrin, kaempferol, isorhamnetin,
        morin, myricetin, myricitrin, natsudaidain, pachypodol,
        pyranoflavonols quercetin, quericitin, rhamnazin,
        rhamnetin, robinin, rutin, spiraeoside, troxerutin and/or
        zanthorhamnin;
    one or more flavanones, optionally butin, eriodictyol,
        hesperetin, hesperidin, homoeriodictyol, isosakurane-
        tin, naringenin, naringin, pinocembrin, poncirin,
        sakuranetin, sakuranin and/or stenrbin;
    one or more flavanonols, optionally dihydrokaempferol
        and/or taxifolin; flavans, such as flavan-3-ols (e.g.,
        catechin (C), catechin 3-gallate (Cg), epicatechins
        (EC), epigallocatechin (EGC) epicatechin 3-gallate
        (ECg), epigallcatechin 3-gallate (EGCg), epiafzel-
        echin, fisetinidol, gallocatechin (GC, gallcatechin
        3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3,4-diols (e.g., leucocyanidin, leucodelphinidin, leucofisetinidin, leucomalvidin, luecopelargonidin, leucopeonidin, leucorobinetinidin, melacacidin and/or teracacidin); and/or one or more isoflavonoids, optionally one or more isoflavones, such as biochanin A, daidzein, formononetin, genistein and/or glycitein; isoflavanes, such as equol, ionchocaxpane and/or laxifloorane; isoflavandiols; isoflavenes, such asgliabrene, haginin D and/or 2-methoxyjudaicin; coumestans, such as coumestrol, plicadin and/or wedelolactone; pterocarpans; and/or roetonoids; and/or one or more neoflavonoids, optionally calophyllolide, coutareagenin, dalbergichromene, dalbergin and/or nivetin; and/or one or more pterocarpans, optionally bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine and/or trifolirhizin.

Paragraph [13]. The method of any one of paragraphs 1-12, wherein the composition further comprises one or more water-soluble anionic surfactants and/or one or more water-insoluble anionic surfactants, optionally: one or more anionic surfactants selected from the group consisting of alkyl carboxylates (e.g., sodium stearate), alkyl sulfates (e.g., alkyl lauryl sulfate, sodium lauryl sulfate), alkyl ether sulfates, alkyl amido ether sulfates, alkyl aryl polyether sulfates, alkyl aryl sulfates, alkyl aryl sulfonates, alkyl sulfonates, alkyl amide sulfonates, alkyl aryl sulfonates, alkyl benzene sulfonates, alkyl diphenyloxide sulfonate, alpha-olefin sulfonates, alkyl naphthalene sulfonates, paraffin sulfonates, alkyl sulfosuccinates, alkyl ether sulfosuccinates, alkylamide sulfosuccinates, alkyl sulfosuccinamates, alkyl sulfoacetates, alkyl phosphates, alkyl ether phosphates, acyl sarconsinates, acyl isethionates, N-acyl taurates, N-acyl-N-alkyltaurates, benzene sulfonates, cumene sulfonates, dioctyl sodium sulfosuccinate, ethoxylated sulfosuccinates, lignin sulfonates, linear alkylbenzene sulfonates, monoglyceride sulfates, perfluorobutanesulfonate, perfluorooctanesulfonate, phosphate ester, styrene acrylic polymers, toluene sulfonates and xylene sulfonates.

Paragraph [14]. The method of any of one of paragraphs 1-13, wherein the composition further comprises one or more cationic surfactants, optionally: alkyltrimethylammonium salts (e.g., cetyl trimethylammonium bromide, cetyl trimethylammonium chloride), cetylpyridinium chloride, benzalkonium chloride, benzethonium chloride, 5-Bromo-5-nitro-1,3-dioxane, dimethyldioctadecylammonium chloride, cetrimonium bromide, dioctadecyldimethylammonium bromide and/or octenidine dihydrochloride.

Paragraph [15]. The method of any one of paragraphs 1-14, wherein the composition further comprises one or more water-soluble nonionic surfactants and/or one or more water-insoluble nonionic surfactants, optionally: alcohol ethoxylates, alkanolamides, alkanolamine condensates, carboxylic acid esters, cetostearyl alcohol, cetyl alcohol, cocamide DEA, dodecyldimethylamine oxides, ethanolamides, ethoxylates of glycerol ester and glycol esters, ethylene oxide polymers, ethylene oxide-propylene oxide copolymers, glucoside alkyl ethers, glycerol alkyl ethers, glycerol esters, glycol alkyl ethers (e.g., polyoxyethylene glycol alkyl ethers, polyoxypropylene glycol alkyl ethers), glycol alkylphenol ethers (e.g., polyoxyethylene glycol alkylphenol ethers,), glycol esters, monolaurin, pentaethylene glycol monododecyl ethers, poloxamer, polyamines, polyglycerol polyricinoleate, polysorbate, polyoxyethylenated fatty acids, polyoxyethylenated mercaptans, polyoxyethylenated polyoxyproylene glycols, polyoxyethylene glycol sorbitan alkyl esters, polyethylene glycol-polypropylene glycol copolymers, polyoxyethylene glycol octylphenol ethers, polyvinyl pynolidones, sugar-based alkyl polyglycosides, sulfoanylamides, sorbitan fatty acid alcohol ethoxylates, sorbitan fatty acid ester ethoxylates, sorbitan fatty acid ester and/or tertiary acetylenic glycols.

Paragraph [16]. The method of any one of paragraphs 1-15, wherein the composition further comprises one or more zwitterionic surfactants, optionally: 3-[(3-Cholamidopropyl)dimethylammonio]-1-propanesulfonate, cocamidopropyl betaine, cocamidopropyl hydroxysultaine, phosphatidylserine, phosphatidylethanolamine, phosphatidylcholine and/or one or more sphingomyelins.

Paragraph [17]. The method of any one of claims 1-16, wherein the composition further comprises one or more soaps and/or organosilicone surfactants, optionally: one or more alkali metal salts of fatty acids.

Paragraph [18]. A method of any one of paragraphs 1-9, wherein the composition comprises a granule comprising one or more enzymes, optionally wherein the granule has an average particle size of 20-2000 μm equivalent spherical diameter.

Paragraph [19]. A method of paragraph 18, wherein the composition comprises a core and optionally one or more coatings surrounding the core, wherein the core optionally comprises:

one ore more additional materials such as fillers, fiber materials (cellulose or synthetic fibers), stabilizing agents, solubilizing agents, suspension agents, viscosity regulating agents, light spheres, plasticizers, salts, lubricants and fragrances;

one or more binders, such as synthetic polymer, wax, fat, or carbohydrate;

one ore more of a salt of a multivalent cation, a reducing agent, an antioxidant, a peroxide decomposing catalyst and/or an acidic buffer component, optionally as a homogenous blend;

one ore more of an inert particle with an enzyme absorbed into it, or applied onto the surface, for example, by fluid bed coating.

Paragraph [20]. The method of any one of paragraphs 1-19, whereby the pest infestation severity and/or pest damage is reduced by at least about 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100% compared to a plant that has not had the phytoprotective agent applied.

Paragraph [21]. The method of any one of paragraphs 1-20, wherein the composition is applied 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and/or 100 days or more after planting.

Paragraph [22]. A method of controlling or preventing damage from a lepidoptera pest in a plant comprising applying a phytoprotective agent comprising an effective amount of an enzyme and an organophosphate to the plant, whereby the severity of the damage is reduced by at least about 30% to about 95% compared to a plant that has not the phytoprotective agent applied.

Paragraph [23]. The method of paragraph 22 wherein the enzyme has lipase activity and the organophosphate is a chlorpyrifos.

Paragraph [24]. The methods of paragraphs 22 or 23 wherein the enzyme is applied at a concentration of at least about 0.03%, 0.04%, 0.05%, 0.06%, and the organophosphate is applied at a concentration of at least about 15, 16, 17, or 18 mg/L.

EXAMPLES

The following examples are not intended to be a detailed catalogue of all the different ways in which the present disclosure may be implemented or of all the features that may be added to the present disclosure. Subjects skilled in the art will appreciate that numerous variations and additions to the various embodiments may be made without departing from the present disclosure. Hence, the following descriptions are intended to illustrate some particular embodiments of the invention and not to exhaustively specify all permutations, combinations and variations thereof.

In the following examples, Composition 1 comprises an enzyme having the polypeptide sequence of SEQ ID NO: 1. In one or more examples, the composition comprises an enzyme having protease, chitinase, lipase, and/or cutinase activity. In one or more examples, the composition and/or insecticide comprises a carbaryl, methomyl, thiodicarb, ethiprole, cyfluthrin, lambda-cyhalothrin, chlorantraniliprole, flubendiamide, *Bacillus thuringiensis* kurstaki (Btk), *Bacillus thuringiensis* tenebrionis (Btt), *Helicoverpa zea* nucleopolyhedrovirus (HzNPV), chlorpyrifos, fipronil, esfenvalerate, deltamethrin, clothianidin, imidacloprid, thiacloprid, spinosad, emamectin benzoate, novaluron, indoxacarb, spirotetramat, and/or flubendiamide. In one or more examples, the pathogen, pest, and/or insect comprise a cabbage looper, tobacco budworm, fall armyworm, Colorado potato beetle, black cutworm, diamondback moth, aphid, western flower thrip, and/or corn earworm.

Experiment 1: In this experiment an enzyme having lipase activity and an organophosphate insecticide comprising chlorpyrifos were used.

An enzyme preparation, designated A, comprising an enzyme having lipase activity was diluted to 10% of the original concentration. 1 mL of the enzyme was added to 9 mL of phosphate buffered saline (PBS). The diluted enzyme was desalted using a desalting column from Sigma Aldrich. Each column having the capacity to desalt 2.5 mL of enzyme, 4 columns for the enzyme were used. Each column was equilibrated with 25 mL of PBS. 2.5 mL of sample was loaded into the column, the flow thru was discarded. 3.5 mL of PBS was added to elute the desalted enzyme. This flow thru was collected for use in the bioassay. 4.95 mL of the desalted enzyme was added to 99 mL PBS. This resulted in a 0.05% total enzyme concentration in the treatment.

The chlorpyrifos insecticide (Sigma 45395) was prepared based on a stock solution of 10× (113 mg/L) using acetone. The insecticide was then diluted further using acetone to a 1:6 ratio.

Approximately 0.3 g of super absorbent granules were placed into 1.25 ounce cups and 6 mL of deionized water was added to hydrate the granules. Discs of green cabbage (2.8 cm) were cut with plastic tubing after the outer leaves had been removed. One disc was used for each individual insect. After cutting, leaf discs were rinsed in deionized water and spin dried in a small salad spinner to remove excess water.

Liquid treatments were poured into either 50 mL glass beakers for the insecticide or medium weigh boats for aqueous treatments and cabbage leaf discs were dipped in the treatment with disposable forceps, tilted to allow excess liquid to run off, and placed into cups with hydrated granules at an angle. This resulted in approximately 0.068 mL of treatment adhering to the discs or approximately 0.11 mL/g of leaf disc.

The cabbage leaf discs were dipped in either acetone (enzyme alone treatment) or chlorpyrifos at 18.83 mg/L of acetone. These were set to dry for 1 hr. The cabbage discs were then dipped either in phosphate buffer (chlorpyrifos alone treatments) or Enzyme A (enzyme alone or in combination with chlorpyrifos treatment), along with a 0.03% surfactant supplement.

After the cabbage discs had dried for 1 hr, a single $3^{rd}$ instar cabbage looper was added to each individual cabbage disc in its cup and a paperboard lid was snapped into place. A total of 20 insects were evaluated for each treatment.

TABLE 1

Mortality of $3^{rd}$ instar cabbage looper treated with Chlorpyrifos, Enzyme A, and a combination of both (LT50 is the estimated time to kill 50% of the insects based on Probit analysis, % mortality is Abbott's corrected and DAT is the days after treatment)

| Treatment | LT50 (95% confidence intervals) in days | % Mortality (7DAT) |
|---|---|---|
| Chlorpyrifos at 18.83 mg/L alone | 11.11 (9.90-12.48) | 11 |
| Enzyme A alone | 11.17 (9.92-12.58) | 11 |
| Enzyme A + Chlorpyrifos at 18.83 mg/L | 7.58 (6.76-8.49) | 44 |

Experiment 2: This experiment was performed similar to Experiment 1, except the chemical insecticide was Clothianidin at 1:2, and the enzyme preparation, designated B, comprises an enzyme having glucosidase activity. The results are shown in Table 2.

TABLE 2

Mortality of $3^{rd}$ instar cabbage looper treated with Clothianidin, Enzyme B, and a combination of both (LT50 is the estimated time to kill 50% of the insects based on Probit analysis, % mortality is Abbott's corrected and DAT is the days after treatment)

| Treatment | LT50 (95% confidence intervals) in days | % Mortality (6DAT) |
|---|---|---|
| Clothianidin at 30 mg/L alone | 19.37 (16.23-23.38) | 0 |
| Enzyme B alone | 30.82 (23.99-40.29) | 0 |
| Enzyme B + Clothianidin at 30 mg/L | 13.26 (11.47-15.43) | 25 |

Experiment 3: This experiment was performed similar to Experiment 2, except the enzyme preparations, designated C and D, respectively, each comprises a different enzyme having protease activity. The results are shown in Table 3.

TABLE 3

Mortality of 3$^{rd}$ instar cabbage looper treated with Clothianidin, Enzyme C, Enzyme D, and combinations of each (LT50 is the estimated time to kill 50% of the insects based on Probit analysis, % mortality is Abbott's corrected and DAT is the days after treatment)

| Treatment | LT50 (95% confidence intervals) in days | % Mortality (5DAT) | % Mortality (6DAT) | % Mortality (7DAT) | % Mortality (8-11DAT) | % Mortality (12-13DAT) | % Mortality (14DAT) |
|---|---|---|---|---|---|---|---|
| Clothianidin at 30 mg/L | 12.34 (10.35-14.79) | 15 | 20 | 30 | 40 | 45 | 45 |
| Enzyme C alone | 49.88 (34.69-73.33) | 0 | 0 | 0 | 5 | 5 | 5 |
| Enzyme C + Clothianidin at 30 mg/L | 7.00 (5.91-8.29) | 50 | 55 | 55 | 60 | 65 | 70 |
| Enzyme D alone | | 0 | 0 | 0 | 0 | 0 | 0 |
| Enzyme D + Clothianidin at 30 mg/L | 9.3 | 40 | 45 | 45 | 50 | 50 | 50 |

The foregoing detailed description has been given for clearness of understanding only and no unnecessary limitations should be understood therefrom as modifications will be obvious to those skilled in the art. It is not an admission that any of the information provided herein is prior art or relevant to the presently claimed inventions, or that any publication specifically or implicitly referenced is prior art.

Unless defined otherwise, all technical and scientific terms used herein have the same meaning as commonly understood by one of ordinary skill in the art to which this invention belongs.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

That which is claimed:

1. A method comprising treating a plant or plant part with a composition comprising an effective amount of a phytoprotective agent, said phytoprotective agent exhibiting lipase activity and comprising a polypeptide having an amino acid sequence that is at least 70 percent identical to the amino acid sequence set forth herein as SEQ ID NO: 1.

2. The method of claim 1, wherein the composition is applied to said plant or plant part in an amount effective to prevent infection and/or infestation of said plant or plant part by one or more pests.

3. The method of claim 1, wherein said phytoprotective agent exhibiting lipase activity and comprising a polypeptide having an amino acid sequence that is at least 75 percent identical to the amino acid sequence set forth herein as SEQ ID NO: 1.

4. The method of claim 1, wherein said phytoprotective agent exhibiting lipase activity and comprising a polypeptide having an amino acid sequence that is at least 80 percent identical to the amino acid sequence set forth herein as SEQ ID NO: 1.

5. The method of claim 1, wherein the phytoprotective agent comprises a polypeptide having an amino sequence that is at least 85 percent identical to the amino acid sequence set forth herein as SEQ ID NO: 1.

6. The method of claim 1, wherein the phytoprotective agent is derived from a *Thermomyces lanuginosus.*

7. The method of claim 1, wherein the phytoprotective agent further comprises one or more carbamates, diamides, macrocyclic lactones, neonicotinoids, organophosphates, phenylpyrazoles, pyrethrins, spinosyns, synthetic pyrethroids, tetronic acids and/or tetramic acids aromatic hydrocarbons, benzimidazoles, benzothiadiazole, carboxamides, carboxylic acid amides, morpholines, phenylamides, phosphonates, quinone outside inhibitors, thiazolidines, thiophanates, thiophene carboxamides and/or triazoles.

8. The method of claim 1, wherein the composition is foliarly applied to a plant.

9. The method of claim 1, wherein the phytoprotective agent is present in said composition in an amount ranging from about 0.001 to about 1% of said composition (by weight, based upon the total weight of said composition.

10. The method of claim 1, wherein the phytoprotective agent is present in said composition in an amount ranging from about 0.01 to about 10% of said composition (by weight, based upon the total weight of said composition.

11. The method of claim 1, wherein the composition comprises a granule comprising said phytoprotective agent.

12. The method of claim 1, wherein the composition comprises a plurality of granules having an average particle size of 20-2000 μm equivalent spherical diameter.

13. The method of claim 1, wherein the composition is applied 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and/or 100 or more days after planting.

14. A method of controlling or preventing damage from a lepidoptera pest in a plant comprising applying an effective amount of a phytoprotective agent to the plant, said phytoprotective agent comprising an organophosphate and an enzyme exhibiting lipase activity and comprising a polypeptide having an amino acid sequence that is at least 70 percent identical to the amino acid sequence set forth herein as SEQ ID NO: 1.

15. The method of claim 14, wherein the enzyme has lipase activity and the organophosphate is a chlorpyrifos.

16. The method of claim 14, wherein the enzyme is applied at a concentration of at least about 0.03%, 0.04%, 0.05%, 0.06%, and the organophosphate is applied at a concentration of at least about 15, 16, 17, or 18 mg/L.

17. A method of controlling or preventing damage from an insect pest in a plant comprising applying an effective amount of a phytoprotective agent to the plant, said phyto-protective agent comprising a neonicotinoid and an enzyme exhibiting lipase activity and comprising a polypeptide having an amino acid sequence that is at least 70 percent identical to the amino acid sequence set forth herein as SEQ ID NO: 1.

18. The method of claim 17, wherein the enzyme has protease activity and the neonicotinoid is a clothianidin.

19. The method of claim 17, wherein the neonicotinoid is applied at a concentration of at least about 28, 29, 30, 31, or 32 mg/L.

* * * * *

SEQUENCE LISTING

```
<160> NUMBER OF SEQ ID NOS: 1

<210> SEQ ID NO 1
<211> LENGTH: 291
<212> TYPE: PRT
<213> ORGANISM: Thermomyces lanuginosus

<400> SEQUENCE: 1

Met Arg Ser Ser Leu Val Leu Phe Phe Val Ser Ala Trp Thr Ala Leu
1               5                   10                  15

Ala Ser Pro Ile Arg Arg Glu Val Ser Gln Asp Leu Phe Asn Gln Phe
            20                  25                  30

Asn Leu Phe Ala Gln Tyr Ser Ala Ala Ala Tyr Cys Gly Lys Asn Asn
        35                  40                  45

Asp Ala Pro Ala Gly Thr Asn Ile Thr Cys Thr Gly Asn Ala Cys Pro
    50                  55                  60

Glu Val Glu Lys Ala Asp Ala Thr Phe Leu Tyr Ser Phe Glu Asp Ser
65                  70                  75                  80

Gly Val Gly Asp Val Thr Gly Phe Leu Ala Leu Asp Asn Thr Asn Lys
                85                  90                  95

Leu Ile Val Leu Ser Phe Arg Gly Ser Arg Ser Ile Glu Asn Trp Ile
            100                 105                 110

Gly Asn Leu Asn Phe Asp Leu Lys Glu Ile Asn Asp Ile Cys Ser Gly
            115                 120                 125

Cys Arg Gly His Asp Gly Phe Thr Ser Ser Trp Arg Ser Val Ala Asp
```

-continued

```
            130                 135                 140

Thr Leu Arg Gln Lys Val Glu Asp Ala Val Arg Glu His Pro Asp Tyr
145                 150                 155                 160

Arg Val Val Phe Thr Gly His Ser Leu Gly Gly Ala Leu Ala Thr Val
                165                 170                 175

Ala Gly Ala Asp Leu Arg Gly Asn Gly Tyr Asp Ile Asp Val Phe Ser
                180                 185                 190

Tyr Gly Ala Pro Arg Val Gly Asn Arg Ala Phe Ala Glu Phe Leu Thr
            195                 200                 205

Val Gln Thr Gly Gly Thr Leu Tyr Arg Ile Thr His Thr Asn Asp Ile
        210                 215                 220

Val Pro Arg Leu Pro Pro Arg Glu Phe Gly Tyr Ser His Pro Ser Pro
225                 230                 235                 240

Glu Tyr Trp Ile Lys Ser Gly Thr Leu Val Pro Val Thr Arg Asn Asp
                245                 250                 255

Ile Val Lys Ile Glu Gly Ile Asp Ala Thr Gly Gly Asn Asn Gln Pro
                260                 265                 270

Asn Ile Pro Asp Ile Pro Ala His Leu Trp Tyr Phe Gly Leu Ile Gly
            275                 280                 285

Thr Cys Leu
        290
```